Nov. 24, 1953  D. S. HORNE ET AL  2,660,069
VARIABLE SPEED TRANSMISSION
Filed Feb. 24, 1950  2 Sheets-Sheet 1

INVENTORS
Donald S. Horne
James W. MacDonald
BY
Parker, Cochran & Farmer,
Attorneys.

Nov. 24, 1953  D. S. HORNE ET AL  2,660,069
VARIABLE SPEED TRANSMISSION
Filed Feb. 24, 1950  2 Sheets-Sheet 2
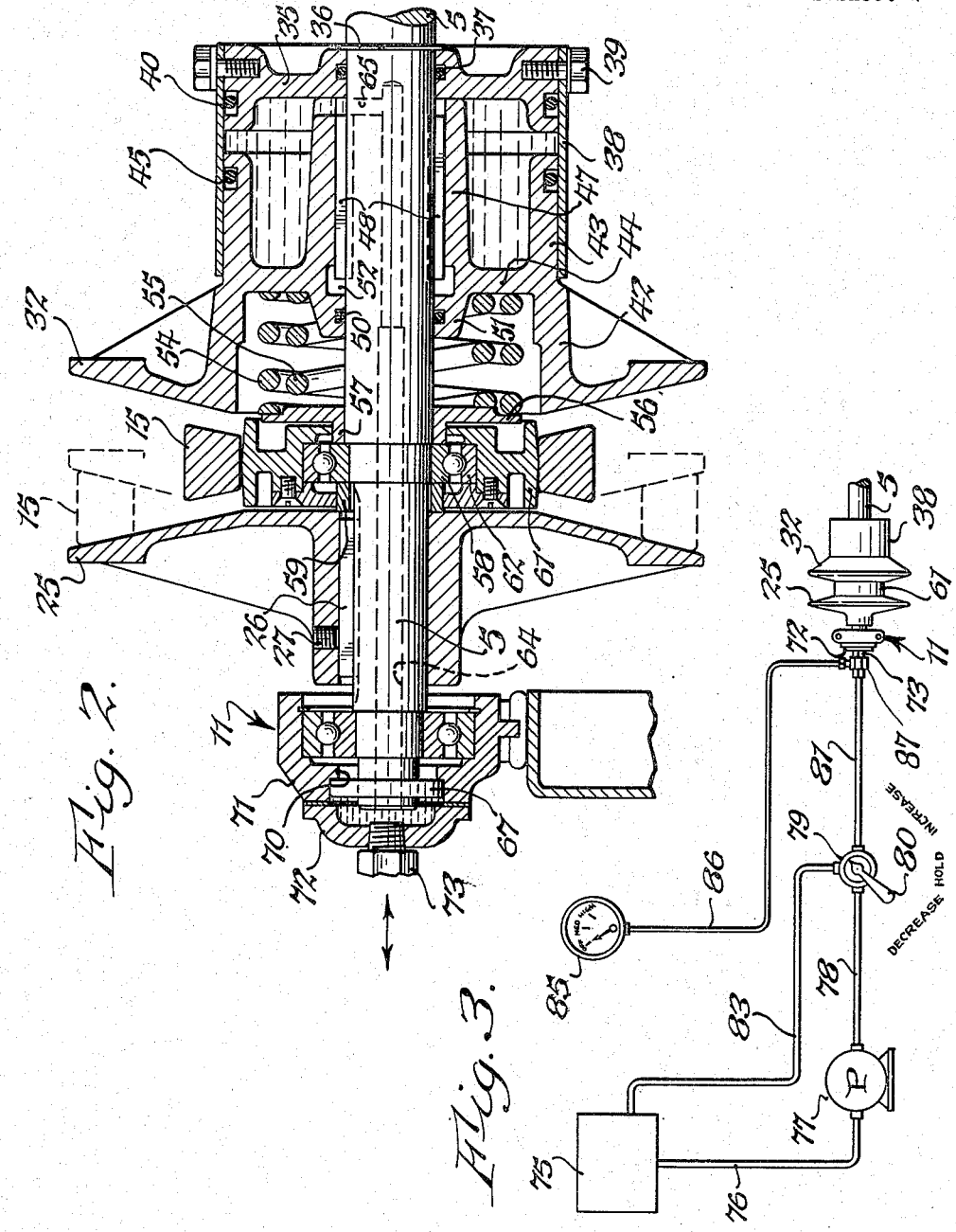
INVENTORS
Donald S. Horne
James W. MacDonald
BY
Parker Frischman Harmer,
Attorneys.

Patented Nov. 24, 1953

2,660,069

UNITED STATES PATENT OFFICE 2,660,069

VARIABLE SPEED TRANSMISSION

Donald S. Horne and James W. MacDonald, Brantford, Ontario, Canada, assignors to Cockshutt Farm Equipment Limited, a corporation of Canada Application February 24, 1950, Serial No. 145,966

10 Claims. (Cl. 74—230.17)

This invention relates to improvements in variable speed transmissions of the kind which include a pair of pulleys cooperating with a V-belt and in which the belt engaging members of the pulleys are adjustable toward and from each other to vary the speed ratio between the driving and driven pulleys.

One of the objects of this invention is to provide a transmission device of this type of improved construction by means of which changes in speed can be easily and quickly effected with the minimum of physical effort on the part of the operator of the machine on which the transmission is employed. Another object is to provide a transmission of this type in which hydraulic means are employed for moving the movable belt engaging member of one of the pulleys toward and from the fixed belt engaging member. A further object is to provide a hydraulic mechanism which is mounted on and rotates with the pulley with which it cooperates. A further object is to provide a transmission of this type with a hydraulic cylinder and ram mounted on the shaft on which the adjustable pulley is mounted, and which eliminates the thrust on the bearings of the shaft on which the pulley is mounted. It is also an object of this invention to provide a transmission of this type in which the pressure exerted on the movable belt engaging member of the pulley is at all times substantially concentric with the axis of the shaft on which the pulley is mounted so as to eliminate uneven wear on the bearings of the movable pulley member. A further object of this invention is to provide a hydraulic mechanism of this type in which the hydraulic pressure acts in one direction on the movable belt engaging member of the pulley and in which spring means are employed for moving the movable belt engaging member in the opposite direction. A further object is to provide means of improved construction for indicating approximately the speed ratio for which the transmission is set.

Other objects and advantages will be apparent from the following description of one embodiment of the invention and the novel features will be particularly pointed out hereinafter in connection with the appended claims.

In the accompanying drawings:

Fig. 2 is a central sectional view thereof, on line 2—2 of Fig. 1.

Fig. 3 is a diagrammatic view showing the hydraulic connections for use with the transmission.

In the accompanying drawing, we have illustrated our invention as applied to the motor drive of a harvester combine. It will be understood, however, that it is not intended to limit this invention for use in connection with harvester combines, since it will be obvious that a variable speed transmission as herein illustrated may be used in connection with drives for other purposes.

Figure 1:
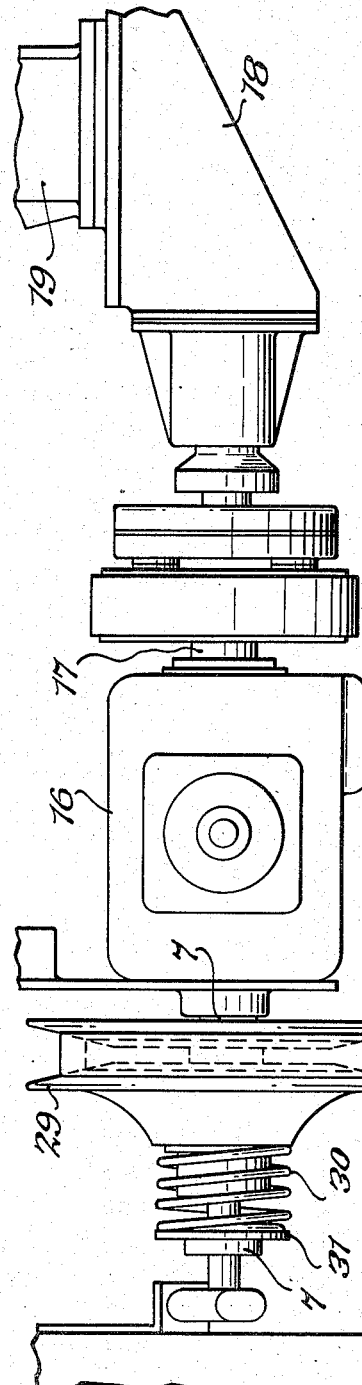
Fig. 1 is a top plan view of a variable speed transmission embodying this invention, a portion of the frame supporting the transmission being omitted.
Figure 1:
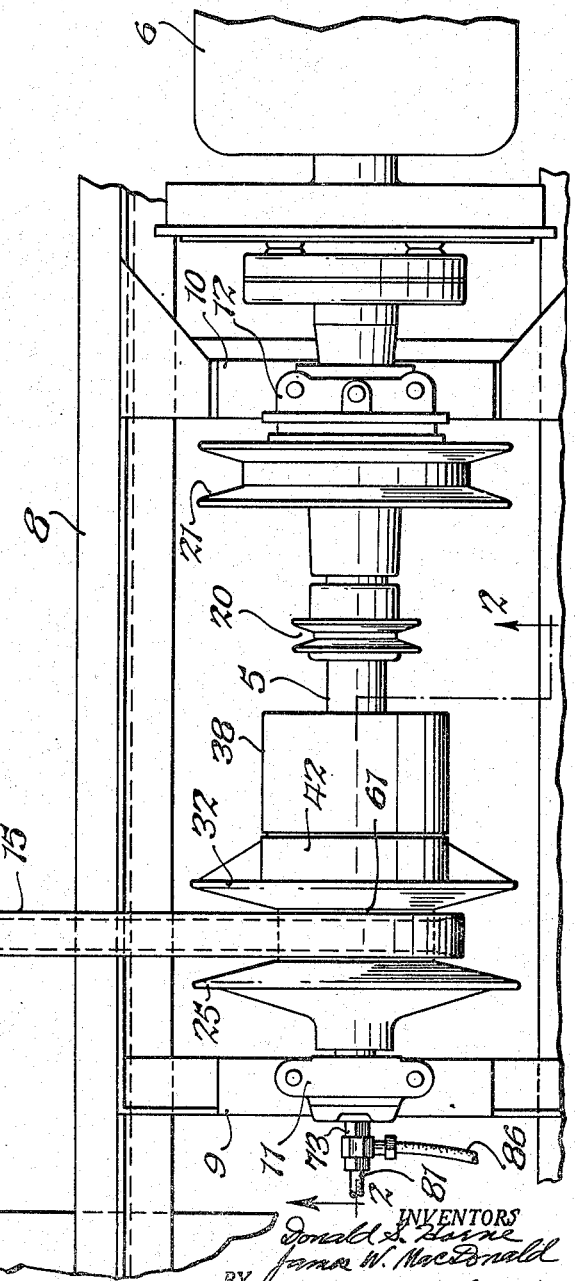

In Fig. 1, 5 represents the driving shaft of the transmission, which in the particular construction illustrated is driven by means of an engine or motor 6, and 7 represents the driven shaft. The mechanism may be mounted on any suitable frame 8, that shown including a pair of cross members 9 and 10 on which suitable bearings 11 and 12 for the driving shaft may be supported. The driven shaft 7 may be similarly mounted on the frame 8. The driving shaft 5 is connected with the driven shaft 7 by means of a V-belt 15 cooperating with pulleys which will hereinafter be more fully described. When our improved transmission is employed in connection with a harvester combine, a speed changing gear transmission 16 is preferably provided in connection with the driven shaft 7 for transmitting rotation to a shaft 17. 18 represents a gear box through which power is transmitted to a differential 19. The driving shaft 5 may be provided with pulleys 20 and 21 for transmitting power to a pump, generator or other accessory.

All of the parts thus far described have heretofore been used in connection with drives for harvester combines and are herein disclosed to facilitate the understanding of our invention, it being understood, however, that our improved transmission may be used in connection with other types of drives.

Each of the pulleys which cooperate with the V-belt 15 includes a belt engaging member which is rigidly secured to the shaft on which the pulley is mounted, and another member which is movable lengthwise of such shaft. The pulley which is mounted on the driven shaft includes a fixed belt engaging member 24 rigidly secured to the shaft 7 and the pulley which is mounted on the driving shaft 5 includes a belt engaging member 25 rigidly secured to the shaft 5, for example, by means of a key 26 and a set screw 27, the key holding this pulley member against rotation about the shaft 5 and the set screw 27 holding the member 25 against endwise movement on this shaft.

29 represents a movable belt engaging member keyed on the hub of the fixed belt engaging member 24 for movement lengthwise thereof toward and from the fixed pulley member 24 and this member 29 is yieldingly urged toward the cooperating member 24 in any suitable manner, for example, by a spring 30 bearing at one end against a collar 31 mounted on the shaft 7 and at its other end against the hub portion of the pulley member 29. This collar is preferably adjustable lengthwise of the shaft, for example, by a threaded connection of the collar with the shaft, so that the pressure of the spring on the pulley 29 may be varied as desired.

32 represents the movable belt engaging member on the driving shaft 5 which cooperates with the fixed pulley member 25, and which is movable toward and from this member 25. Consequently, as the movable member 32 is moved toward the fixed pulley member 25, the belt 15 will be engaged between the two pulley members and as the member 32 is moved into closer proximity to the member 25, the portion of the belt engaged by this pulley will be moved outwardly from the axis of the pulley, for example, into the broken line position shown in Fig. 2. This belt will, consequently, engage the two pulley members at portions thereof of greater diameter, and this will produce a corresponding movement of the portion of the belt engaging the pulley members 24 and 29 into closer proximity to the axis of the driven shaft 7, the spring 30 yielding to permit the movable pulley member 29 to move away from the fixed member 24. Consequently, by adjusting this relation to the belt to the two pulley members, the speed ratio between the shafts 5 and 7 may be varied as desired.

The movement of the movable pulley member 32 has heretofore been effected by suitable mechanism actuated by the operator of the machine on which the transmission mechanism was used, and when considerable power was transmitted by the pulleys, such actuation required considerable strength and was, consequently, fatiguing. In accordance with our invention, the movable pulley member 32 is actuated by fluid pressure which can be readily controlled by the operator by means of a valve. In the accompanying drawings, we have illustrated by way of example one embodiment of this invention by means of which the movable member 32 may be readily moved toward the fixed pulley member 25 by means of hydraulic liquid, such as oil, but it will be understood that the mechanism shown may, if desired, be actuated by means of compressed air or other gas. In the construction illustrated, a cylinder part and a ram or piston part are mounted on the shaft 5, preferably concentric therewith. One of these parts is secured to the shaft 5 and the other part is connected with the movable pulley member 32 to force the same toward the fixed pulley member 25. In the construction shown, the cylinder is secured to the shaft and includes a head 35 which is held against endwise movement on the shaft 5 in any suitable manner, for example, by means of a shoulder on the shaft or split ring 36, Fig. 2, extending into an annular slot or groove in the shaft 5 and engaging the hub portion of the cylinder head 35. A sealing member 37, such as an oil ring of flexible material, arranged in an annular groove in the hub of the cylinder head 35 may be employed, to prevent leakage of oil or other actuating fluid between the cylinder head and the shaft 5. The cylinder includes a cylindrical wall portion 38 which may be formed integral with or rigidly secured to the cylinder head 35. In the construction shown, this cylinder part 38 is formed separately from the head 35 and may be made of a length of seamless tubing secured to the head 35 in any suitable manner, for example, by means of bolts or screws 39. A tight joint between the head and the cylindrical wall of the cylinder may be effected in any desired manner, for example, by means of a ring or gasket member 40 arranged in a groove 41 formed in the cylinder head 35.

The ram or piston, in the particular construction shown, is formed integral with the movable pulley member 32 and for this purpose, this pulley member has an annular extension or wall 42 terminating in a portion 43 of reduced diameter formed to slidingly fit within the inner surface of the cylinder wall 38. A sealing ring 45 is arranged within an annular groove extending inwardly from the outer surface of the reduced portion 43, which serves to form a tight joint between the ram or piston and the cylinder. This annular wall 42 is formed integral with a transverse web 44. The ram or piston also includes an inner annular wall 47 which extends outwardly from the web 44 and forms a sleeve about the shaft 5. This inner annular ram wall 47 may be held against rotation relatively to the shaft 5 in any suitable manner, for example, by means of keys 48 seated in keyways in the shaft 5 and extending into keyways formed on the inner surface of the annular wall 47. A fluid tight seal between the ram and the shaft 5 may be formed by means of a sealing or oil ring 50 arranged in a groove extending into a projection 51 of the ram, this projection being spaced from the inner annular sleeve 47 to form a space 52 into which the hydraulic fluid, such as oil, may enter for lubricating the bearing surface between the keys 48 and the keyways in the sleeve 47, so that the ram and the pulley member 32 may slide freely lengthwise of the shaft 5. Any other suitable means for connecting the movable pulley member 32 with the ram or piston may be provided.

From the foregoing description, it will be obvious that when oil or other fluid under pressure is admitted into the space within the cylinder wall 38, pressure will be exerted on the movable pulley member 32 urging the same to the left in Figs. 1 and 2 for engaging the belt 15 and causing the portion thereof engaging the pulley on the shaft 5 to be moved outwardly to increase the diameter of the driving surface of this pulley acting on the belt 15.

Any suitable means may be provided for moving the movable pulley member 32 to the right in Figs. 1 and 2. This may, of course, be effected by merely withdrawing hydraulic fluid from the interior of the cylinder 38, but preferably we provide one or more springs 54 and 55 to act against the movable pulley member 32 to urge the same to the right in Figs. 1 and 2, and thus move the movable pulley member quickly away from the other pulley member 25, so that the driven pulley and the mechanism driven thereby, such as the driven wheels of a tractor, may be stopped quickly. These springs may be arranged within the annular extension 42 of the pulley member 32, and they are preferably coiled in opposite directions, so that they will not become entwined. One end of each of these springs acts directly against the transverse web 44 of the movable pulley member 32, and the other ends of these springs act against a disk 56 having an annular flange 57 which extends about the shaft 5 and which bears against the inner race 58 of a bearing. At the other end of this race a ring 59 is interposed between the fixed pulley member 25 and the race 58 so that in effect the springs 54 and 55 react against the fixed pulley member 25 through the medium of the disk 56, flange 57, bearing race 58 and ring 59.

When the pulley members are spaced apart so as to be out of engagement with the belt 15, the driving force will not be transmitted to the belt and in order to save wear on the belt, a pulley or wheel 61 is mounted on the outer race 62 of a ball bearing. Consequently, when the belt 15 is out of engagement with the pulley members 25 and 32, as shown in Figs. 1 and 2, and bears on the pulley or wheel 61, the belt will stand still, since the shaft 5 may revolve without transmitting rotation to the pulley 61 because of the ball bearing.

Any suitable or desired means may be provided for transmitting fluid under pressure to and from the cylinder 38. In the particular construction shown, the shaft 5 may be made hollow or provided with a bore 64 extending lengthwise thereof and connecting with a transverse aperture 65 adjacent to the inner face of the cylinder head 35, so that fluid may be transmitted lengthwise of the shaft 54 and through the transverse passage 65 into and out of the cylinder. The shaft may be provided adjacent to the outer end thereof with a suitable seal 67 mounted adjacent to the outer end of the shaft and bearing against an inwardly extending shoulder 70 formed in a journal box or bearing housing 71 which constitutes part of the bearing 11 of the shaft 5, which may be self-alining or of any other suitable construction. A cap 72 is removably secured to the end of the bearing housing 71, and a suitable pipe connection 73 is screwed or otherwise secured to the cap 72. By means of this construction, oil or other fluid under pressure may be admitted to the cap 72 through the pipe connection 73 from a suitable source of supply. This fluid will fill the interior of the cap 72 and enter the passage 64 in the shaft for passage to the hydraulic cylinder. By means of this construction, it will be noted that there is substantially no endwise pressure exerted on the shaft 5 by means of the fluid under pressure.

Fluid under pressure may be transmitted to the cap 72 in any suitable or desired manner. When a liquid, such as oil is employed, the construction shown by way of example in Fig. 3, may be employed, in which 75 represents a reservoir for liquid which is connected by means of a pipe or duct 76 with the inlet end of a pump 77. This pump is connected by means of a pipe 78 to a valve 79 controlled by a suitable valve handle 80 preferably arranged in a location convenient to the operator. The valve is connected by means of a pipe 81 to the pipe connection 73 secured to the bearing housing cap 72. A discharge pipe 83 connects the valve 79 with the reservoir or container 75.

By means of this arrangement, the valve 79, which is not herein described in detail for the reason that valves of this type are readily available on the open market, may be set into a position to admit liquid under pressure from the pump 77 to the pipe 81 leading to the cylinder in the transmission mechanism. The pump 77 is preferably of relatively low capacity so that hydraulic fluid will not be discharged too rapidly into the hydraulic cylinder, thus giving the movabel pulley member 32 a chance to force the belt 15 outwardly gradually and thus avoid pinching the belt. The valve will be held in position to feed the desired amount of liquid under pressure to the cylinder 38 until the speed has been increased to the desired extent, whereupon the valve is moved in a closed position indicated by the world "Hold" in Fig. 3. The pulley member 32 will then be held in the position into which it has been set and additional liquid discharged by the pump will be passed by the valve into the discharge pipe 83.

When it is desired to decrease the speed of the transmission mechanism the valve handle 80 is moved into the "Decrease" position as indicated in Fig. 3, whereupon fluid from the cylinder 38 will pass through the pipe 81, through the valve 79 into the discharge pipe 83 to the reservoir 75. Consequently, it will be obvious that by means of the mechanism described, the speed of the driven shaft may be regulated at will to any desired extent by merely manipulating the valve handle 80.

It is also very desirable to provide the operator with an indication as to the setting of the movable pulley member 32, since during normal operation of the mechanism, the valve member 80 will, of course, be in the closed or "Hold" position. Since the springs 54 and 55 offer increasing resistance to the movement of the pulley member 32 as the same is moved toward the fixed pulley member 25, it follows that the pressure of the fluid will be increased with each increment of movement of the pulley member 32 toward the pulley member 25. Consequently, the pressure of fluid in the cylinder will indicate the position of the pulley member 32. Hence a pressure gage may be employed to indicate the position of the pulley member 32 and the speed ratio between the pulleys on the driving and driven shafts. We have, consequently, employed a pressure gage 85 connected by means of a pipe 86 with the pipe 81 for example through a coupling 87. This pressure gage, by indicating the pressure existing in the cylinder 38, will inform the operator approximately what the speed ratio is between the driving shaft 5 and the driven shaft 7.

When a variable speed transmission of this type is used in connection with a harvester combine, the speed of the combine over the ground may be very readily varied to far greater extent than is possible merely by means of the usual gear shaft 16. The speed at which the harvester combine should be operated will depend upon the nature of the crop in various portions of the field. If the harvester combine approaches a portion of the field in which the crop is very dense, it is necessary to slow down the speed of the harvester combine so that the same will not become congested or clogged with a larger amount of cut grain than can be readily handled by the same. When, on the other hand, the harvester combine passes over a portion of the field in which the crop is scant, the speed of the harvester combine may be increased. By merely manipulating the valve handle 80, it is, consequently, possible for the operator to control the speed of movement of the harvester combine over the ground in such a manner as to keep the same operating at full capacity at all times.

The mechanism described has the further advantage that it is very reliable in operation and produces much less wear on the transmission mechanism than in case of mechanisms in which the position of the movable pulley member is controlled mechanically. This is due to the fact that the hydraulic fluid acts on the ram in areas which are concentric with the axis of the shaft 5 so that there will be no tendency of the movable member 32 to become cocked or to produce excessive wear on its bearing with the shaft on which it is mounted. The mechanism has the further advantage that the pressures exerted on the ram or piston are wholly confined to short length of the shaft 5 and do not react against the bearings 11 and 12 for this shaft. The springs 54 and 55 acting on the ram of the press serve to quickly discharge hydraulic fluid from the cylinder back into the reservoir or container 75, when the valve 80 is set into "Decrease" position. Since oil is generally used as a hydraulic fluid in mechanisms of this kind, it will be obvious that the oil also acts as a lubricant for the movable pulley member 32.

While the hydraulic mechanism has been illustrated in the accompanying drawings as actuating the movable member of the pulley on the drive shaft 5, yet it will be obvious that if desired the hydraulic mechanism may be used to actuate the movable pulley member on the driven shaft. Consequently, the mechanism described will act equally well if the shaft 7 were the driving shaft and the shaft 5 were the driven shaft.

It will be understood that various changes in the details, materials, and arrangements of parts which have been herein described and illustrated in order to explain the nature of the invention, may be made by those skilled in the art within the principle and scope of the invention, as expressed in the appended claims.

We claim as our invention:

1. A pulley for a variable speed transmission and for cooperation with a V-belt, including a shaft, a pair of belt contacting members mounted on said shaft and one of which is movable lengthwise of said shaft toward and from the other belt contacting member, said movable belt contacting member having on the face thereof opposite to the other belt contacting member a hollow cylindrical extension terminating in a piston, a cylinder mounted on said shaft into which said piston fits and which is held against movement in a direction away from said pulley, means for supplying fluid under pressure to said cylinder for urging said movable belt contacting member toward the other belt contacting member, a coil spring surrounding said shaft and arranged within said cylindrical extension and reacting against said belt contacting members to oppose the action of the fluid pressure within said cylinder and to force pressure fluid out of said cylinder when the supply of fluid under pressure to said cylinder is decreased, and an idler pulley freely rotatable on said shaft and with which said belt engages when said movable belt contacting member is moved out of engagement with said belt, said idler pulley entering said hollow cylindrical extension when said movable belt contacting member is moved into engagement with said belt.

2. A pulley for a variable speed transmission and for cooperation with a V-belt, including a shaft, a pair of belt contacting members mounted on said shaft and one of which is movable lengthwise of said shaft toward and from the other belt contacting member, said movable belt contacting member having on the face thereof opposite to the other belt contacting member a piston, a cylinder mounted on said shaft and into which said piston extends and which is held against endwise movement on said shaft in a direction away from said movable belt contacting member, said shaft having a longitudinal bore terminating at one end thereof, and a transverse bore terminating in said cylinder, and means for supplying fluid under pressure to said longitudinal bore of said shaft for transmission to said cylinder.

3. A pulley according to claim 2, characterized in that said shaft adjacent to the end thereof in which said bore terminates is rotatable in a bearing housing, a sealing ring connecting said shaft and said housing and forming a fluid tight space in said housing, and means for supplying fluid under pressure to said space for passage into said longitudinal bore of said shaft.

4. A pulley according to claim 2, characterized in that said shaft adjacent to the end thereof in which said bore terminates is rotatable in a bearing housing, a sealing ring connecting said shaft and said housing and forming a fluid tight space in said housing, means for supplying fluid under pressure to said space for passage into said longitudinal bore of said shaft, and a pressure gage connected with said housing for determining the relative position of said movable belt contacting member to said other belt contacting member.

5. A pulley for a variable speed transmission and for cooperation with a V-belt, including a shaft, a pair of belt-contacting members, one of which is secured in fixed relation to said shaft and the other of which is movable lengthwise of said shaft toward and from said first mentioned belt-contacting member and held against rotation about said shaft, said movable belt-contacting member having an annular extension concentric with said shaft, a transverse web within said annular extension and forming with said annular extension a piston, an annular bearing extension concentric with said shaft and within said first mentioned extension and extending from said web in a direction away from the belt contacting face of said movable belt contacting member to form a bearing engaging said shaft, a cylinder mounted on said shaft and arranged in telescopic relation to said first mentioned annular extension, and means for supplying fluid under pressure to said cylinder for urging said movable pulley member toward said fixed pulley member.

6. A pulley according to claim 5 and including a compression spring arranged within said first mentioned tubular extension and bearing at one end against said web and having its other end held against movement by said fixed pulley member.

7. A pulley for a variable speed transmission and for cooperation with a V-belt, including a shaft, a pair of belt-contacting members, one of which is secured in fixed relation to said shaft and the other of which is movable lengthwise of said shaft toward and from said first mentioned belt-contacting member, said second belt-contacting member having a pair of hollow, integral, tubular extensions concentric with the axis of said shaft and arranged one within the other, a transverse web connecting said tubular extensions intermediate of the ends of the outer of said extensions, said outer of said extensions and said web forming a piston and the inner of said extensions forming a bearing about said shaft, a cylinder secured to said shaft and arranged telescopically about said outer extension, means for admitting fluid under pressure to said cylinder, and a coil compression spring extending into said outer tubular extension and bearing at one end thereof against said web and at the other end against a part fixed on said shaft, said spring forcing pressure fluid from said cylinder when the supply of pressure fluid thereto is interrupted.

8. A pulley for a variable speed transmission and for cooperation with a V-belt, including a shaft, a pair of belt contacting members mounted on said shaft and one of which is movable lengthwise of said shaft toward and from the other belt contacting member, said other belt contacting member being fixed to said shaft, said movable belt contacting member having on the face thereof opposite to the other belt contacting member a hollow cylindrical extension terminating in a piston, a cylinder mounted on said shaft and held against movement in a direction away from said pulley, said piston being reciprocable in said cylinder, means for supplying fluid under pressure to said cylinder for urging said movable belt contacting member toward said other belt contacting member, an idler pulley freely rotatable on said shaft and with which said belt engages when said movable belt contacting member is moved out of engagement with said belt, an anti-friction bearing on which said idler pulley is mounted and including an inner race held against movement relatively to said shaft, a spring arranged within said cylindrical extension and bearing at one end thereof against said movable belt contacting member, a disk against which the other end of said spring bears and which has a part engaging said inner race, whereby said spring urges said piston into said cylinder against said fluid pressure.

9. A variable speed transmission pulley according to claim 8, in which said inner race is held against movement in one direction by said fixed belt contacting member, whereby pressure of said spring acts against both belt contacting members.

10. A variable speed transmission pulley according to claim 8, in which said idler pulley enters said hollow cylindrical extension when said movable belt contacting member is moved toward said other belt contacting member into engagement with said belt.

DONALD S. HORNE.
JAMES W. MacDONALD.

References Cited in the file of this patent

UNITED STATES PATENTS

| Number | Name | Date |
|---|---|---|
| 942,065 | Grebel | Dec. 7, 1909 |
| 1,035,860 | Conradson | Aug. 20, 1912 |
| 1,053,918 | Meyer | Feb. 18, 1913 |
| 2,130,995 | Henney | Sept. 20, 1938 |
| 2,210,976 | Hallinan | Aug. 13, 1946 |
| 2,346,868 | Perry | Apr. 18, 1944 |
| 2,496,061 | Miner | Jan. 31, 1950 |
| 2,529,489 | Curtis | Nov. 14, 1950 |

FOREIGN PATENTS

| Number | Country | Date |
|---|---|---|
| 8,451 | Great Britain | 1907 |
| 109,621 | Sweden | Jan. 25, 1944 |
| 898,174 | France | Apr. 12, 1945 |